(12) United States Patent
Shen et al.

(10) Patent No.: US 8,830,902 B2
(45) Date of Patent: Sep. 9, 2014

(54) METHOD, SYSTEM AND DEVICE FOR WIRELESS COMMUNICATION

(75) Inventors: Xiaodong Shen, Beijing (CN); Qixing Wang, Beijing (CN); Jianjun Liu, Beijing (CN); Zhihua Shi, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 134 days.

(21) Appl. No.: 13/638,457

(22) PCT Filed: Apr. 8, 2011

(86) PCT No.: PCT/CN2011/072535
§ 371 (c)(1),
(2), (4) Date: Sep. 28, 2012

(87) PCT Pub. No.: WO2011/124147
PCT Pub. Date: Oct. 13, 2011

(65) Prior Publication Data
US 2013/0021964 A1    Jan. 24, 2013

(30) Foreign Application Priority Data

Apr. 8, 2010    (CN) .......................... 2010 1 0144375

(51) Int. Cl.
*H04W 88/04* (2009.01)
*H04W 88/06* (2009.01)
*H04W 28/04* (2009.01)
*H04W 72/04* (2009.01)

(52) U.S. Cl.
USPC .......................................... 370/315; 370/329

(58) Field of Classification Search
CPC .... H04B 7/2606; H04W 88/04; H04W 88/06; H04W 28/04; H04W 72/04
USPC .......................................... 370/315, 328, 329
See application file for complete search history.

(56) References Cited

FOREIGN PATENT DOCUMENTS

| CN | 101166055 A | 4/2008 |
|---|---|---|
| CN | 101675694 A | 3/2010 |

OTHER PUBLICATIONS

Author Unknown, "3rd Generation Partnership Project; Technical Specification Group Radio Access Network; Evolved Universal Terrestrial Radio Access (E-UTRA); Further advancements for E-UTRA physical layers aspects (Release 9)," 3GPP Organizational Partners, 2010, 104 pages.

*Primary Examiner* — Ronald Abelson
(74) *Attorney, Agent, or Firm* — Kilpatrick Townsend & Stockton LLP (57) ABSTRACT

A method, system and device for wireless communication are provided by the present invention. The method includes that: from the ending of the Transmit-Receive Guard interval (TRG) to the beginning of the Receive-Transmit Guard interval (RTG), an evolved Node B (eNB) carries Common Reference Signals (CRSs) or Demodulated Reference Signals (DMRSs) on the carriers are used for transmitting data signals and/or control signals to a Relay Node (RN); the RN demodulates, according to the CRSs or the DMRSs, the signals transmitted by the eNB; the TRG is the guard interval of the transition, for the RN, from transmitting signals to receiving signals over the backhaul link, and the RTG is the guard interval of the transition, for the RN, from receiving signals to transmitting signals over the backhaul link. The application of the present invention enables the RN to receive the data signals and/or control signals transmitted by the eNB correctly.

14 Claims, 9 Drawing Sheets

Fig. 1

--Prior Art--

Fig. 2

--Prior Art--

METHOD, SYSTEM AND DEVICE FOR WIRELESS COMMUNICATION

The present application is a U.S. National Stage application of International Application No. PCT/CN2011/072535, filed on Apr. 8, 2011, designation the United States, and claims priority to Chinese Patent Application No. 201010144375.7, filed with the State Intellectual Property Office of China on Apr. 13, 2010, entitled "Method, system and device for wireless communication", which is hereby incorporated by reference in its entirety.

FIELD OF THE INVENTION

The present invention relates to the field of mobile communications and particularly o a method, system and device for wireless communication.

BACKGROUND OF THE INVENTION

Information is required to be transmitted at a high rate in a future mobile communication system, for example, the rate at which information is transmitted is up to 1 Giga bit per second (Gbit/s). Since a larger bandwidth and a higher carrier frequency have to be occupied for transmission of information at a high rate, only a hot spot can be covered due to a considerable path loss in some edge area of a cell, so transmission of information at a high rate can not be ensured in the edge area of the cell. In this case, high-rate information from a base station can be forwarded by means of the technology of Relay Node (RN) to thereby improve a coverage area of information transmission at a high rate from the base station. Apparently, the RN technology is an effective solution to a further extended coverage area of information transmission at a high rate and expanded capacity of a cellular system.

Figure 1:
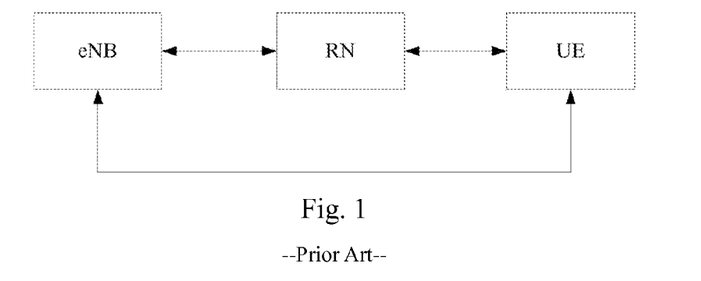
FIG. 1 is a schematic composition diagram of an existing mobile con system with an RN.

FIG. 1 is a schematic composition diagram of an existing mobile communication system with an RN.

Referring to FIG. 1, an information transmission link of the system illustrated in FIG. 1 is divided into two hops, i e., an access link and a backhaul link. The access link refers to a Transmission Time Interval (TTI) for transmission of information between an evolved Node B (eNB) and a User Equipment (UE) and a TTI for transmission of information between the RN and the UE. The backhaul link refers to a TTI for transmission of information between the eNB and the RN, where the information between the eNB and the RN and the information between the eNB and the UB can be transmitted in the same TTI.

Figure 2:
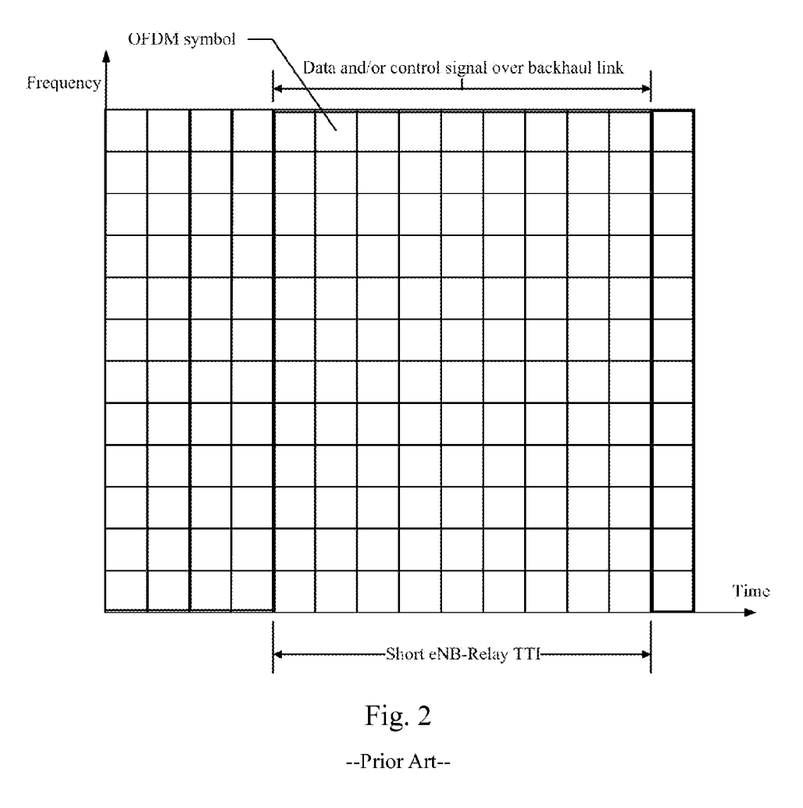
FIG. 2 is a schematic structural diagram of an existing frame over a backhaul link of an RN.

FIG. 2 is a schematic structural diagram of an existing frame over a backhaul link of an RN.

In FIG. 2, the abscissa represents time and the ordinate represents frequency. In FIG. 2, a Transmit-Receive Guard (TRG) is a guard interval required by the RN from transmitting a signal to receiving a signal over the backhaul link, and the TRG occupies the $2^{nd}$, $3^{rd}$ and $4^{th}$ Orthogonal Frequency Division Multiplexing (OFDM) symbols of all the carriers; and a Receive-Transmit Guard (RTG) is a guard interval required by the RN from receiving a signal to transmitting a signal over the backhaul link, and the RTG occupies the $14^{th}$ OFDM symbol period of all the carriers. The RN remains in a silent state over the access link, that is, it neither receives a data signal nor transmits a data signal, in a temporal range between the TRG and the RTG, i.e., in a short Cyclic Prefix (CP) backhaul link TTI or a short eNB-Relay TTI. Particularly, the RTG is necessary only for absolute synchronization between the RN and the eNB, and if no absolute synchronization is required between the RN and the eNB, the RTG may not be set in FIG. 2, that is, no guard interval is required to be set for the RN from receiving a signal to transmitting a signal over the backhaul link.

The RN receives a data signal and/or a control signal from the eNB after the end of the TRG and before the start of the RTG. A specific solution to how the RN can receive correctly a data signal and/or a control signal transmitted from the eNB has been absent so far in the prior art.

SUMMARY OF THE INVENTION

In view of this, the invention provides a method, system and device for wireless communication, so that an RN can receive correctly a data signal and/or a control signal transmitted from an eNB.

Technical solutions of the invention are embodied as follows.

There is a wireless communication method including: carrying, by an evolved Node B (eNB), a Common Reference Signal (CRS) or a Demodulation Reference Signal (DMRS) over a carrier over which a data signal and/or a control signal is transmitted to a Relay Node (RN) after the end of a guard interval TRG and before the start of a guard interval RTG, wherein the TRG is a guard interval for the RN to transform from transmitting a signal to receiving a signal over a backhaul link, and the RTG is a guard interval for the RN to transform from receiving a signal to transmitting a signal over the backhaul link; and demodulating, by the RN, the signal transmitted from the eNB according to the CRS or the DMRS.

There is a wireless communication system including an evolved Node B (eNB) and a Relay Node (RN), wherein the eNB is configured to carry a Common Reference Signal (CRS) or a Demodulation Reference Signal (DMRS) over a carrier over which a data signal and/or a control signal is transmitted to the RN, in a period after the end of a guard interval TRG and before the start of a guard interval RTG, wherein the TRG is a guard interval for the RN to transform from transmitting a signal to receiving a signal over a backhaul link, and the RTG is a guard interval for the RN to transform from receiving a signal to transmitting a signal over the backhaul link; and the RN is configured to demodulate the data signal and/or the control signal transmitted from the eNB according to the received CRS or the DMRS.

There is an evolved Node B including a signal filling module and a transmitting module, wherein the signal filling module is configured to carry a Common Reference Signal (CRS) or a Demodulation Reference Signal (DMRS) over a carrier over which a data signal and/or a control signal is transmitted to a Relay Node (RN), after the end of a guard interval TRG and before the start of a guard interval RTG, wherein the TRG is a guard interval for the RN to transform from transmitting a signal to receiving a signal over a backhaul link, and the RTG is a guard interval for the RN to transform from receiving a signal to transmitting a signal over the backhaul link; and the transmitting module is configured to transmit the data signal and/or the control signal to the RN over the carrier over which the CRS or the DMRS is carried.

There is a relay node including a receiving module and a signal demodulation module, wherein the receiving module is configured to receive a Common Reference Signal (CRS) or a Demodulation Reference Signal (DMRS) carried over a carrier, over which a data signal and/or a control signal is transmitted, by an evolved Node B (eNB) in a period after the end of a guard interval TRG and before the start of a guard interval RTG, wherein the TRG is a guard interval for the relay node to transform from transmitting a signal to receiving signal over a backhaul link, and the RTG is a guard interval for the relay node to transform from receiving a signal to transmitting a signal over the backhaul link; and the signal demodulating module is configured to demodulate the data signal and/or the control signal transmitted from the eNB according to the received CRS or DMRS.

In the embodiments of the invention, the eNB carries a CRS or a DMRS over a carrier, over which a data signal and/or a control signal is transmitted to the RN, after the end of a guard interval TRG and before the start of a guard interval RTG, so that the RN can demodulate the data signal and/or the control signal according to the CRS or the DMRS, and thus the RN can receive correctly the data signal and/or the control signal transmitted from the eNB. Moreover, the CRS and the DMRS are filled in OFDM symbols between the end of the TRG and the start of the RTG so the TRG and the RTG will not be structurally corrupted, thereby further ensuring correct reception by the RN of the data signal and/or the control signal from the eNB.

DETAILED DESCRIPTION OF THE EMBODIMENTS

In a wireless communication method according to an embodiment of the invention, an eNB carries a Common Reference Signal (CRS) or a Demodulation Reference Signal (DMRS), over a carrier over which a data signal and/or a control signal is transmitted to an RN, after the end of a guard interval TRG and before the start of a guard interval RTG, and the RN demodulates the signal transmitted from the eNB according to the CRS or the DMRS, where the TRG is a guard interval for the relay node RN to transform from transmitting a signal to receiving a signal over a backhaul link, and the RTG is a guard interval for the RN to transform from receiving a signal to transmitting signal over the backhaul link.

In the embodiment of the invention, the CRS or the DMRS is carried over, the carrier, over which a data signal and/or a control signal is transmitted to the RN, and used as a pilot signal to demodulate the data signal and/or the control signal so that the RN can demodulate correctly the received data signal and/or control signal according to the CRS or the DMRS.

Moreover, the CRS and the DMRS are filled in an OFDM symbol period between the end of the TRG and the start of the RTG instead of being filled in the TRG and the RTG, so the TRG and the RTG will not be structurally corrupted, making it possible to further ensure correct reception by the RN of the data signal and/or the control signal from the eNB.

In an embodiment of the invention, the TRG occupies the $2^{nd}$, $3^{rd}$ and $4^{th}$ OFDM symbols arranged sequentially in a temporal order in a Physical Resource Block (PRB) pair, and the RTG occupies the $14^{th}$ OFDM symbol arranged sequentially in the temporal order in the PRB pair.

An embodiment of the invention presents a specific solution to a specific time and frequency at which, that is, a corresponding pilot pattern in which, the eNB fills the CRS and the DMRS after the end of the TRG and before the start of the RTG, Pilot patterns according to embodiments of the invention will be introduced below with reference to the drawings.

Figure 3:
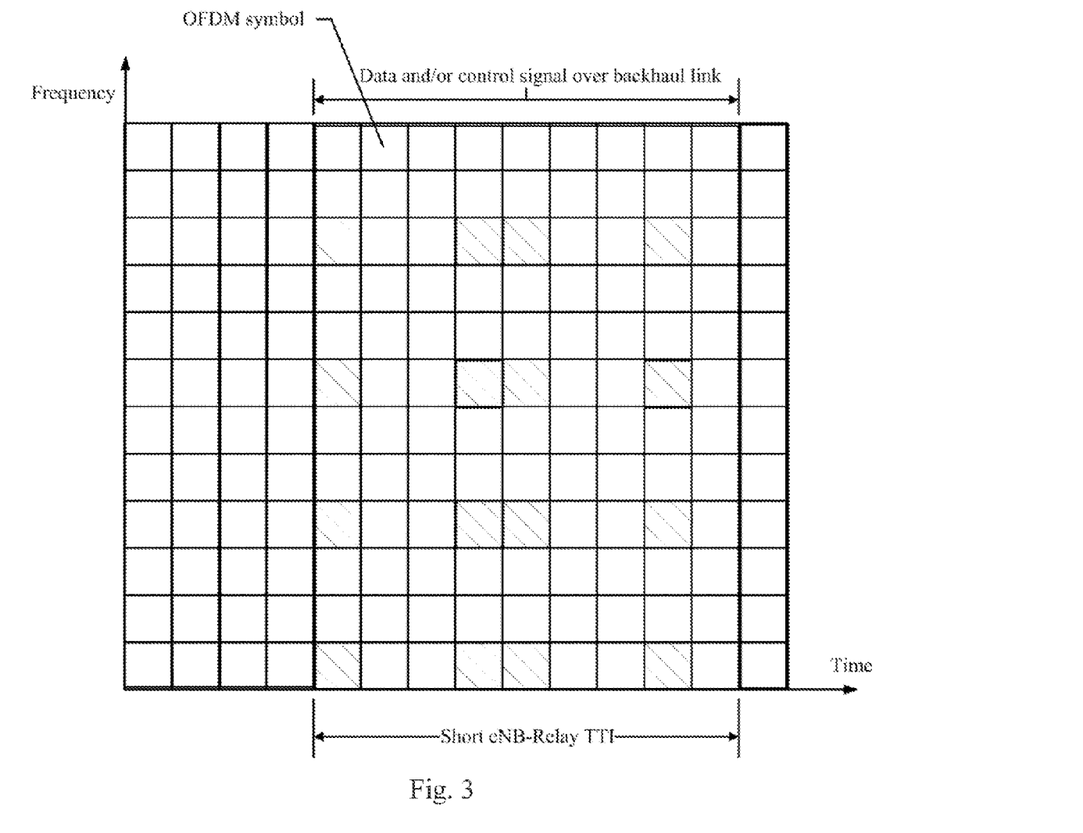
FIG. 3 is a schematic diagram of a first pilot pattern according to an embodiment of the invention.

FIG. 3 is a schematic diagram of a first pilot pattern according to an embodiment of the invention.

In FIG. 3, the abscissa represents time in a unit with a length of one OFDM symbol, and the ordinate represents frequency in a unit with a length of a frequency resource occupied for one carrier.

In FIG. 3, the eNB carries a CRS as a pilot signal over a carrier over which a data signal and/or a control signal is transmitted to the RN, particularly carries a CRS in each of the $1^{st}$, $4^{th}$, $5^{th}$ and $8^{th}$ OFDM symbols after the end of the TRG, and carries a CRS over each of the $1^{st}$, $4^{th}$, $7^{th}$ and $10^{th}$ carriers in an ascending order of the frequencies of respective carriers in a PRB pair, in each of the OFDM symbols with the CRSs to be carried therein, that is, the $1^{st}$, $4^{th}$, $5^{th}$ and $8^{th}$ OFDM symbols after the end of the TRG.

The TRG can occupy the $2^{nd}$, $3^{rd}$ and $4^{th}$ OFDM symbols over all the carriers; and an RTG can occupy the $14^{th}$ OFDM symbol over all the carriers.

Figure 4:
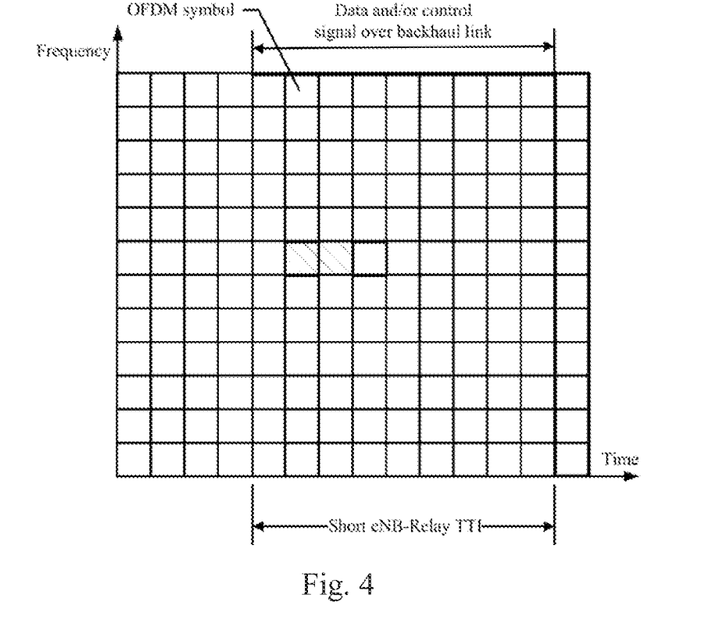
FIG. 4 is a first schematic diagram of a second pilot pattern according to an embodiment of the invention.
Figure 5:
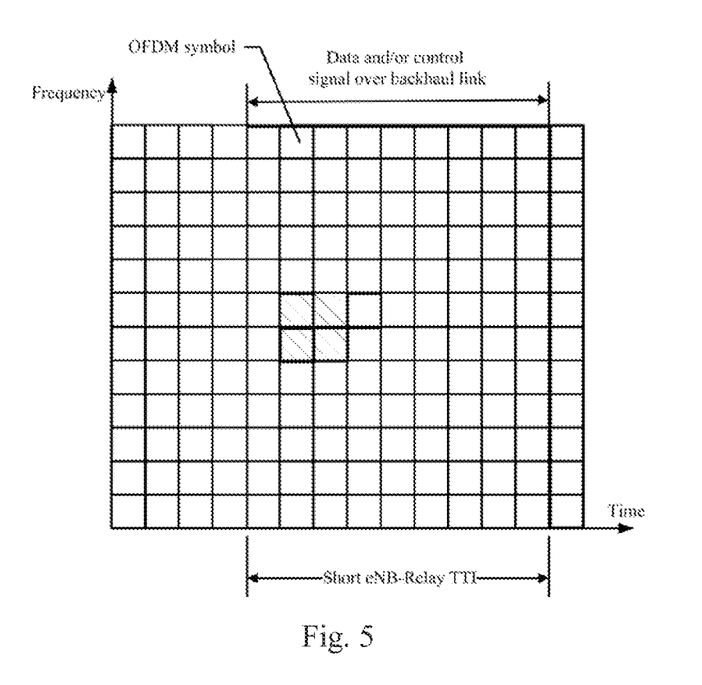
FIG. 5 is a second schematic diagram of a second pilot pattern according to an embodiment of the invention.

FIG. 4 and FIG. 5 are schematic diagrams of a second pilot pattern according to an embodiment of the invention, where FIG. 4 shows a pilot pattern when the eNB adopts single-stream transmission or dual-stream transmission, and FIG. 5 shows a pilot pattern when the eNB adopts three-stream transmission or four-stream transmission.

In FIG. 4 and FIG. 5, the eNB carries a DMRS as a pilot signal over a carrier over which a data signal and/or a control signal is transmitted to the RN, particularly carries a DMRS in each of the $2^{nd}$ and $3^{rd}$ OFDM symbols after the end of the TRG, and in each of the OFDM symbols with the DMRSs to be carried therein, the eNB carries a DMRS over the $7^{th}$ carrier in an ascending order of the frequencies of respective carriers in a PRB pair as illustrated in FIG. 4 if the eNB adopts single-stream transmission or dual-stream transmission, or the eNB carries a DMRS over each of the $6^{th}$ and $7^{th}$ carriers in an ascending order of the frequencies of respective carriers in a PRB pair as illustrated in FIG. 5 if the eNB adopts three-stream or four-stream transmission of a data signal and/or a control signal.

Figure 6:
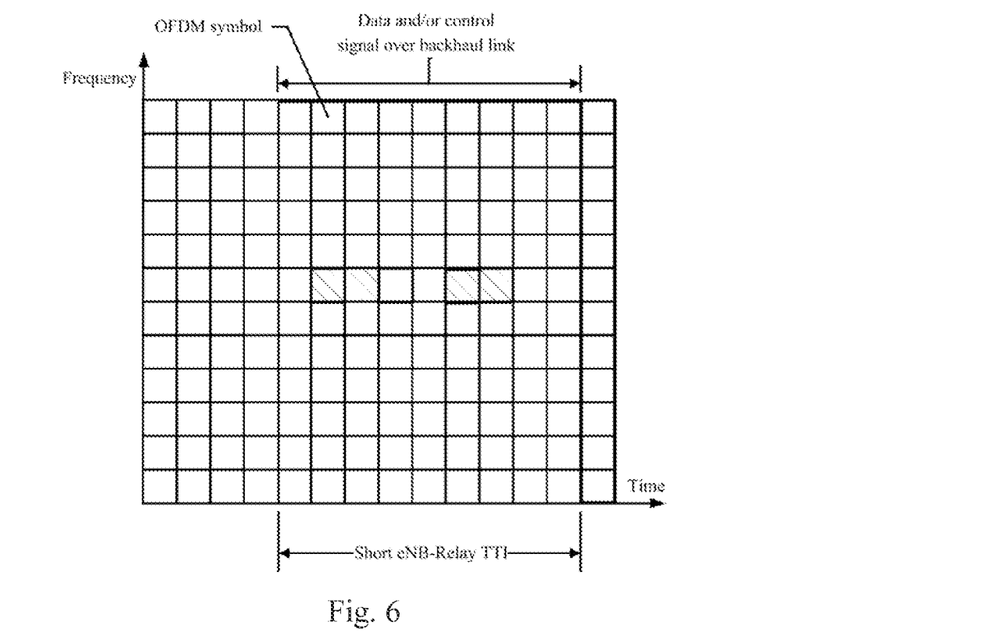
FIG. 6 is a first schematic diagram of a third pilot pattern according to an embodiment of the invention.
Figure 7:
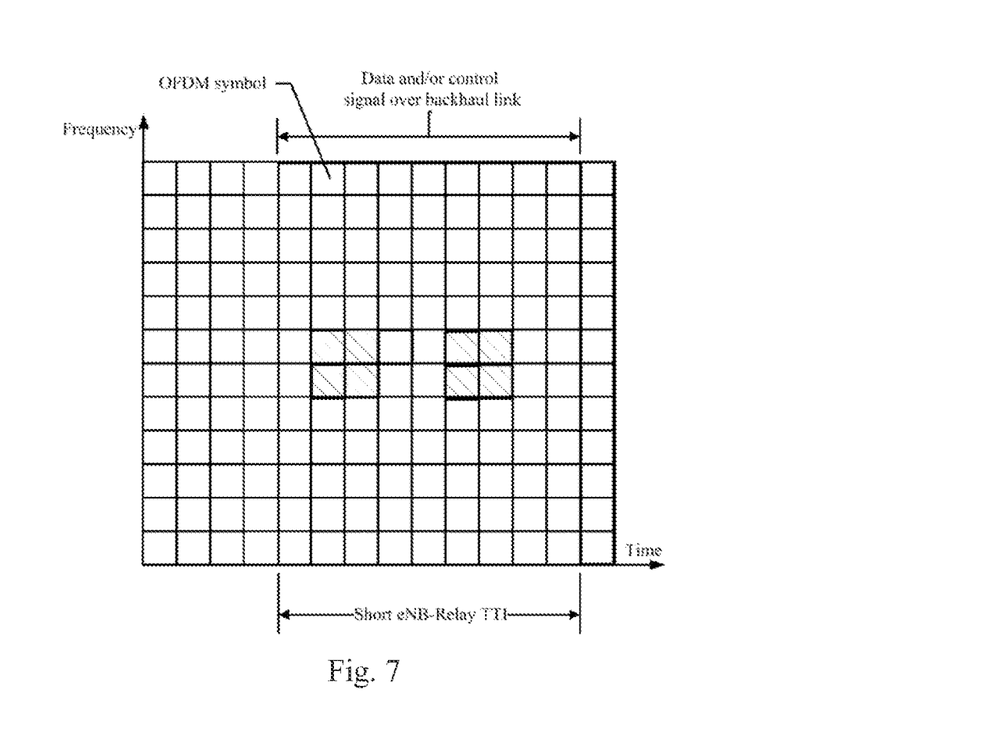
FIG. 7 is a second schematic diagram of a third pilot pattern according to an embodiment of the invention.

FIG. 6 and FIG. 7 are schematic diagrams of a third pilot pattern according to an embodiment of the invention, where FIG. 6 shows a pilot pattern when the eNB adopts single-stream transmission or dual-stream transmission, and FIG. 5 shows a pilot pattern when the eNB adopts three-stream transmission or four-stream transmission.

In FIG. 6 and FIG. 7, the eNB carries a DMRS in each of the $2^{nd}$, $3^{rd}$, $6^{th}$ and $7^{th}$ OFDM symbols after the end of the TRG, and in each of the OFDM symbols with the DMRSs to be carried therein, the eNB carries a DMRS over the $7^{th}$ carrier in an ascending order of the frequencies of respective carriers in a PRB pair as illustrated in FIG. 6 if the eNB adopts single-stream transmission or dual-stream transmission, or the eNB carries a DMRS over each of the $6^{th}$ and $7^{th}$ carriers in an ascending order of the frequencies of respective carriers in a PRB pair as illustrated in FIG. 7 if the eNB adopts three-stream or four-stream transmission of a data signal and/or a control signal.

Figure 8:
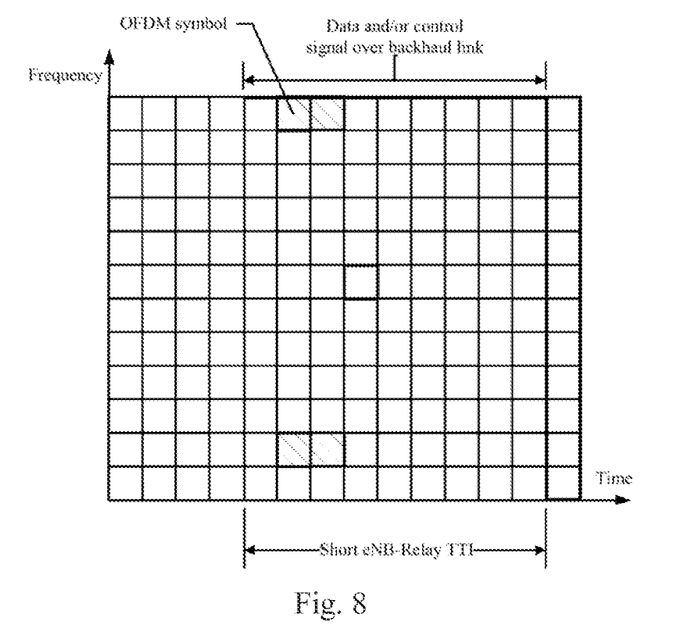
FIG. 8 is a first schematic diagram of a fourth pilot pattern according to an embodiment of the invention.
Figure 9:
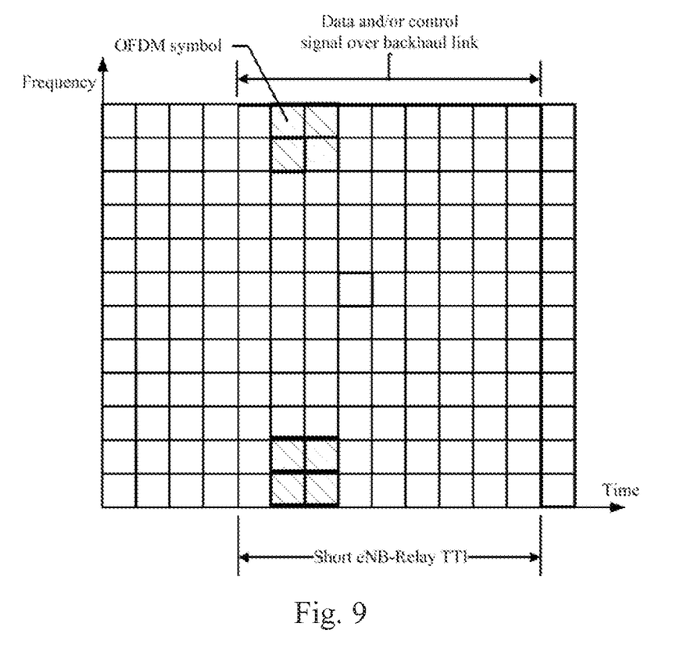
FIG. 9 is a second schematic diagram of a fourth pilot pattern according to an embodiment of the invention.

FIG. 8 and FIG. 9 are schematic diagrams of a fourth pilot pattern according to an embodiment of the invention, where FIG. 8 shows a pilot pattern when the eNB adopts single-stream transmission or dual-stream transmission, and FIG. 9 shows a pilot pattern when the eNB adopts three-stream transmission or four-stream transmission.

In FIG. 8 and FIG. 9, the eNB carries a DMRS in each of the $2^{nd}$ and $3^{rd}$ OFDM symbols after the end of the TRG, and in each of the OFDM symbols with the DMRSs to be carried therein, the eNB carries a DMRS over each of the $2^{nd}$ and $12^{th}$ carriers in an ascending order of the frequencies of respective carriers in a PRB pair as illustrated in FIG. 8 if the eNB adopts single-stream transmission or dual-stream transmission, or the eNB carries a DMRS over each of the $1^{st}$, $2^{nd}$, $11^{th}$ and $12^{th}$ carriers in an ascending order of the frequencies of respective carriers in a PRB pair as illustrated in FIG. 9 if the eNB adopts three-stream or four-stream transmission of a data signal and/or a control signal.

Figure 10:
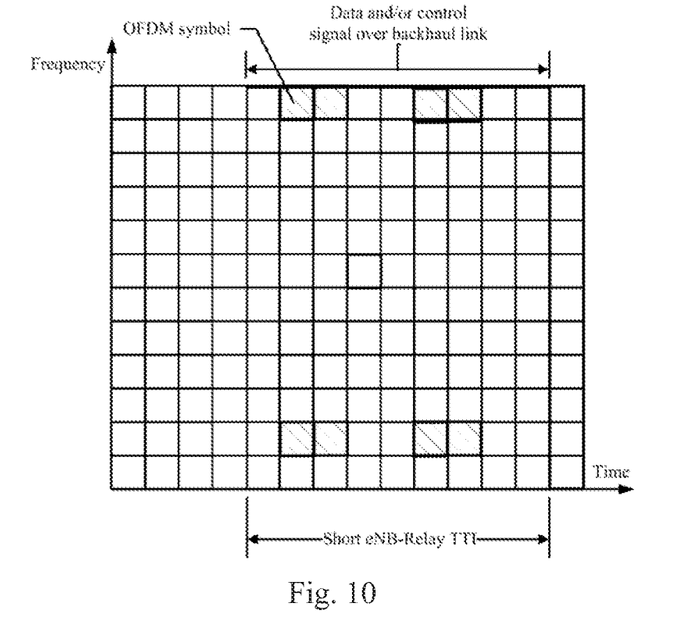
FIG. 10 is a first schematic diagram of a fifth pilot pattern according to an embodiment of the invention.
Figure 11:
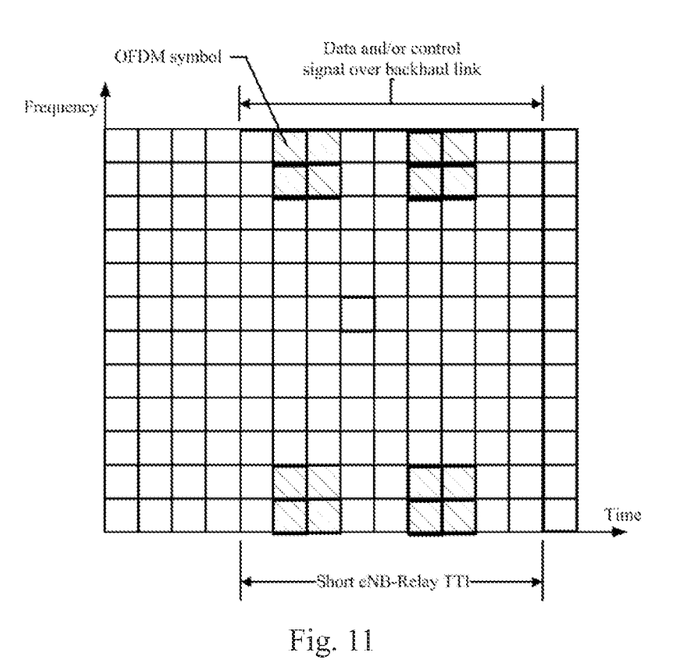
FIG. 11 is a second schematic diagram of a fifth pilot pattern according to an embodiment of the invention.

FIG. 10 and FIG. 11 are schematic diagrams of a fifth pilot pattern according to an embodiment of the invention, where FIG. 10 shows a pilot pattern when the eNB adopts single-stream transmission or dual-stream transmission, and FIG. 11 shows a pilot pattern when the eNB adopts three-stream transmission or four-stream transmission.

In FIG. 10 and FIG. 11, the eNB carries a DMRS in each of the $2^{nd}$, $3^{rd}$, $6^{th}$ and $7^{th}$ OFDM symbols after the end of the TRG, and in each of the OFDM symbols with the DMRSs to be carried therein, the eNB carries a DMRS over each of the $2^{nd}$ and $12^{th}$ carriers in an ascending order of the frequencies of respective carriers in a PRB pair as illustrated in FIG. 10 if the eNB adopts single-stream transmission or dual-stream transmission, or the eNB carries a DMRS over each of the $1^{st}$, $2^{nd}$, $11^{th}$ and $12^{th}$ carriers in an ascending order of the frequencies of respective carriers in a PRB pair as illustrated in FIG. 11 if the eNB adopts three-stream or four-stream transmission of a data signal and/or a control signal.

Figure 12:
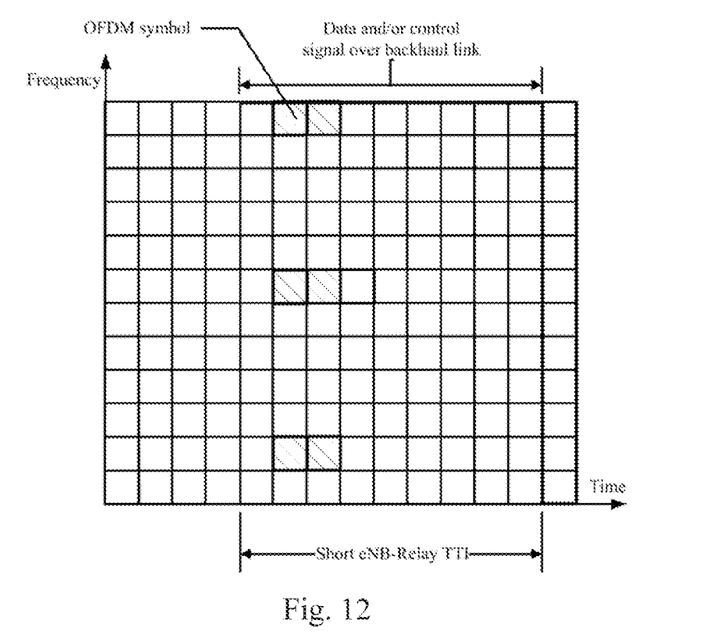
FIG. 12 is a first schematic diagram of a sixth pilot pattern according to an embodiment of the invention.
Figure 13:
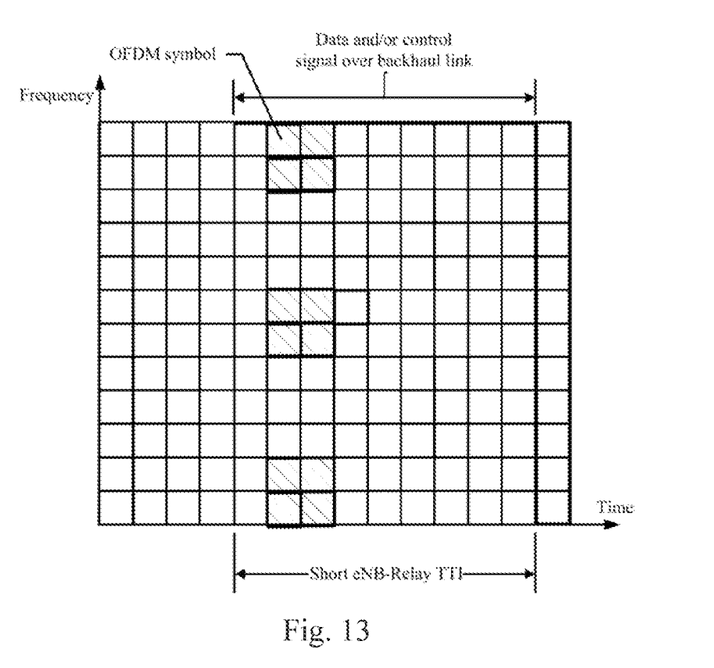
FIG. 13 is a second schematic diagram of a sixth pilot pattern according to an embodiment of the invention.

FIG. 12 and FIG. 13 are schematic diagrams of a sixth pilot pattern according to an embodiment of the invention, where FIG. 12 shows a pilot pattern when the eNB adopts single-stream transmission or dual-stream transmission, and FIG. 13 shows a pilot pattern when the eNB adopts three-stream transmission or four-stream transmission.

In FIG. 12 and FIG. 13, the eNB carries a DMRS in each of the $2^{nd}$ and $3^{rd}$ OFDM symbols after the end of the TRG, and in each of the OFDM symbols with the DMRSs to be carried therein, the eNB carries a DMRS over each of the $2^{nd}$, $7^{th}$ and $12^{th}$ carriers in an ascending order of the frequencies of respective carriers in a PRB pair as illustrated in FIG. 12 if the eNB adopts single-stream transmission or dual-stream transmission, or the eNB carries a DMRS over each of the $1^{st}$, $2^{nd}$, $6^{th}$, $7^{th}$, $11^{th}$ and $12^{th}$ carriers in an ascending order of the frequencies of respective carriers in a PRB pair as illustrated in FIG. 13 if the eNB adopts three-stream or four-stream transmission of a data signal and/or a control signal.

Figure 14:
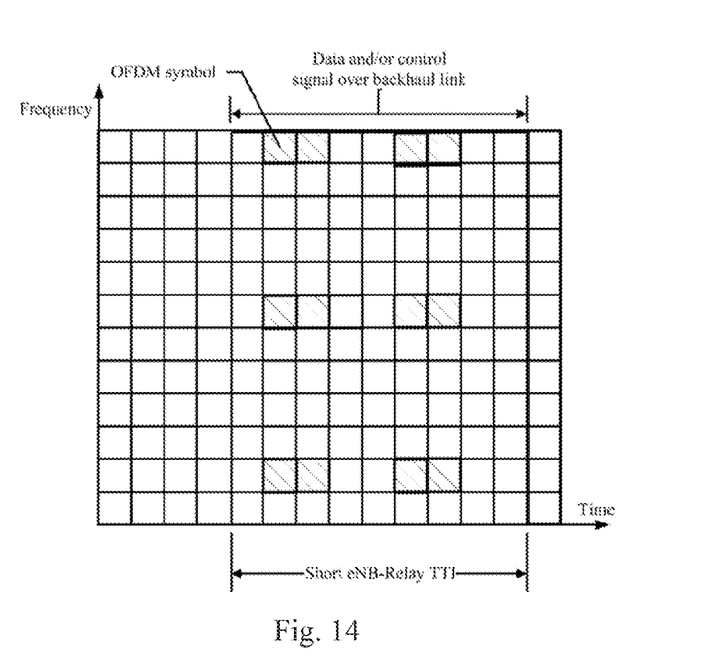
FIG. 14 is a first schematic diagram of a seventh pilot pattern according to an embodiment of the invention.
Figure 15:
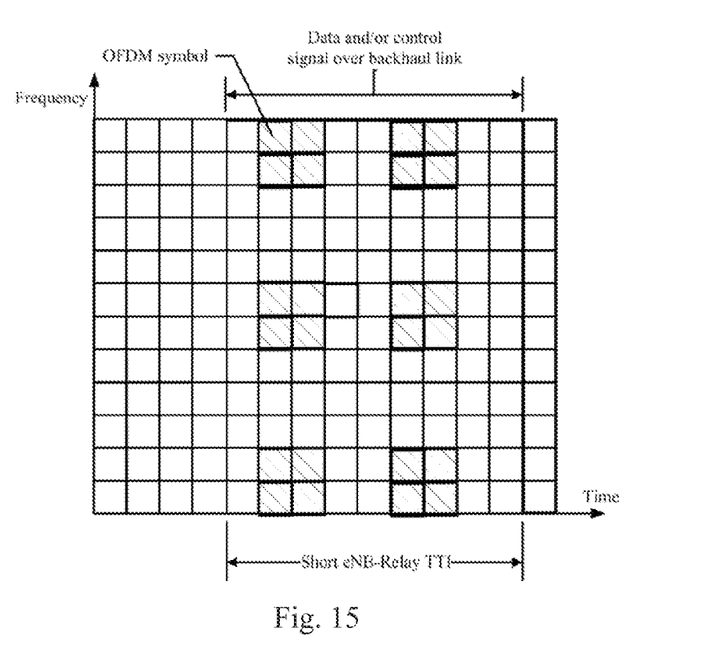
FIG. 15 is a second schematic diagram of a seventh pilot pattern according to an embodiment of the invention.

FIG. 14 and FIG. 15 are schematic diagrams of a seven pilot pattern according to an embodiment of the invention, where FIG. 12 shows a pilot pattern when the eNB adopts single-stream transmission or dual-stream transmission, and FIG. 13 shows a pilot pattern when the eNB adopts three-stream transmission or four-stream transmission.

In FIG. 14 and FIG. 15, the eNB carries a DMRS in each of the $2^{nd}$, $3^{rd}$, $6^{th}$ and $7^{th}$ OFDM symbols after the end of the TRG, and in each of the OFDM symbols with the DMRSs to be carried therein, the eNB carries a DMRS over each of the $2^{nd}$, $7^{th}$ and $12^{th}$ carriers in an ascending order of the frequencies of respective carriers in a PRB pair as illustrated in FIG. 14 if the eNB adopts single-stream transmission or dual-stream transmission, or the eNB carries a DMRS over each of the $1^{st}$, $2^{nd}$, $6^{th}$, $7^{th}$, $11^{th}$ and $12^{th}$ carriers in an ascending order of the frequencies of respective carriers in a PRB pair as illustrated in FIG. 15 if the eNB adopts three-stream or four-stream transmission of a data signal and/or a control signal.

In a pilot pattern according to an embodiment of the invention, pilot signals are distributed over corresponding carriers as uniformly as possible according to the density of the pilot signals and the frequencies of the carriers, and when the eNB and the RN perform wireless communication in the pilot pattern, the RN can well demodulate a data signal and/or a control signal transmitted from the eNB due to uniform distribution of the pilot signals to thereby improve correctness of demodulating the signal.

In the pilot patterns illustrated in FIG. 4 and FIG. 5, for example, a DMRS is carried in the $7^{th}$ carrier in an ascending order of frequencies in a PRB pair, and since the frequency of the $7^{th}$ carrier is centrally located among the frequencies of respective carriers in the PRB pair and there is a smaller difference in frequency between each of the other carriers and the $7^{th}$ carrier, thus there is a higher correctness ratio of signal demodulation with the DMRS carried over the $7^{th}$ carrier.

In another example, in the pilot patterns illustrated in FIG. 8 and FIG. 9, a DMRS is carried in each of the $2^{nd}$ and $12^{th}$ carriers in an ascending order of frequencies in a PRB pair, and for demodulation of a data signal and/or a control signal over a carrier at a centrally arranged frequency (e.g., the $6^{th}$ or $7^{th}$ carrier), the DMRSs carried over the $2^{nd}$ and $12^{th}$ carriers can be interpolated to thereby improve the correctness ratio of signal demodulation.

Figure 16:
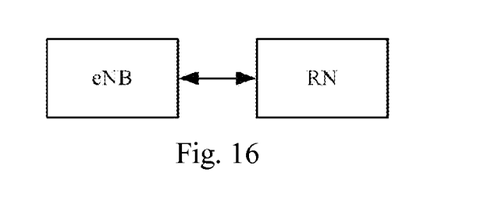
FIG. 16 is a schematic composition diagram of a wireless communication system according to an embodiment of the invention.

Following the foregoing wireless communication method, an embodiment of the invention further provides a radio communication system, and reference can be made to FIG. 16 for details thereof.

FIG. 16 is a schematic composition diagram of a wireless communication system according to an embodiment of the invention.

As illustrated in FIG. 16, the wireless communication system includes an eNB and an RN.

The eNB carries a CRS or a DMRS over a carrier over which a data signal and/or a control signal is transmitted to the RN, in a period after the end of a guard interval TRG and before the start of a guard interval RTG, where the TRG is a guard interval for the RN to transform from transmitting a signal to receiving a signal over a backhaul link, and the RTG is a guard interval for the RN to transform from receiving a signal to transmitting a signal over the backhaul link.

The RN demodulates the data signal and/or the control signal transmitted from the eNB according to the received CRS or the DMRS.

The TRG occupies the $2^{nd}$, $3^{rd}$ and $4^{th}$ OFDM symbols arranged sequentially in a temporal order in a PRB pair, and the RTG occupies the $14^{th}$ OFDM symbol arranged sequentially in the temporal order in the PRB pair.

When the eNB carries the CRS over the carrier over which the data signal and/or the control signal is transmitted to the RN, the eNB carries the CRS in each of the $1^{st}$, $4^{th}$, $5^{th}$ and $8^{th}$ OFDM symbols after the end of the TRG, and carries the CRS over each of the $1^{st}$, $4^{th}$, $7^{th}$ and $10^{th}$ carriers in an ascending order of the frequencies of respective carriers in a PRB pair, in each of the OFDM symbols with the CRSs to be carried therein.

When the eNB carries the DMRS over the carrier over which the data signal and/or the control signal is transmitted to the RN, the eNB carries the DMRS in each of the $2^{nd}$ and $3^{rd}$ OFDM symbols after the end of the TRG, and carries the DMRS over the $7^{th}$ carrier or each of the $6^{th}$ and $7^{th}$ carriers in an ascending order of the frequencies of respective carriers a PRB pair, in each of the OFDM symbols with the DMRSs to be carried therein; or the eNB carries the DMRS in each of the $2^{nd}$, $3^{rd}$, $6^{th}$ and $7^{th}$ OFDM symbols after the end of the TRG, and carries the DMRS over the $7^{th}$ carrier or each of the $6^{th}$ and the $7^{th}$ carriers in an ascending order of the frequencies of respective carriers in a PRB pair, in each of the OFDM symbols with the DMRSs to be carried therein; or the eNB carries the DMRS in each of the $2^{nd}$ and $3^{rd}$ OFDM symbols after the end of the TRG, and carries the DMRS over each of the $2^{nd}$ and $12^{th}$ or the $1^{st}$, $2^{nd}$, $11^{th}$ and $12^{th}$ carriers in an ascending order of the frequencies of respective carriers in a PRB pair, in each of the OFDM symbols with the DMRSs to be carried therein; or the eNB carries the DMRS in each of the $2^{nd}$, $3^{rd}$, $6^{th}$ and $7^{th}$ OFDM symbols after the end of the TRG, and carries the DMRS over each of the $2^{nd}$ and $12^{th}$ or the $1^{st}$, $2^{nd}$, $11^{th}$ and $12^{th}$ carriers in an ascending order of the frequencies of respective carriers in a PRB pair, in each of the OFDM symbols with the DMRSs to be carried therein; or the eNB carries the DMRS in each of the $2^{nd}$ and $3^{rd}$ OFDM symbols after the end of the TRG, and carries the DMRS over each of the $2^{nd}$, $7^{th}$ and $12^{th}$ or the $1^{st}$, $2^{nd}$, $6^{th}$, $7^{th}$, $11^{th}$ and $12^{th}$ carriers in an ascending order of the frequencies of respective carriers in a PRB pair, in each of the OFDM symbols with the DMRSs to be carried therein; or the eNB carries the DMRS in each of the $2^{nd}$, $3^{rd}$, $6^{th}$ and $7^{th}$ OFDM symbols after the end of the TRG, and carries the DMRS over each of the $2^{nd}$, $7^{th}$ and $12^{th}$ or the $1^{st}$, $2^{nd}$, $6^{th}$, $7^{th}$, $11^{th}$ and $12^{th}$ carriers in an ascending order of the frequencies of respective carriers in a PRB pair, in each of the OFDM symbols with the DMRSs to be carried therein.

Figure 17:
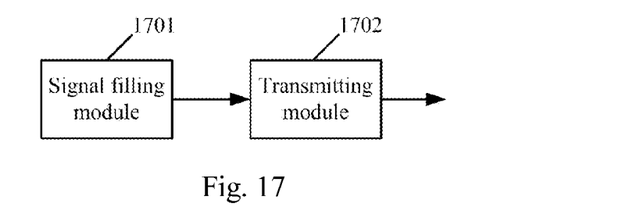
FIG. 17 is a schematic structural diagram of an eNB according to an embodiment of the invention.
Figure 18:
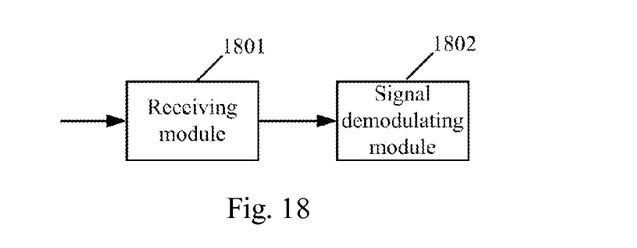
FIG. 18 is a schematic structural diagram of a relay node according to an embodiment of the invention.

Following the foregoing wireless communication method and wireless communication system, embodiments of the invention further provide an eNB and a relay node, and reference can be made to FIG. 17 and FIG. 18 for details thereof.

FIG. 17 is a schematic structural diagram of an eNB according o an embodiment of the invention.

As illustrated in FIG. 17, the eNB includes a signal filling module 1701 and a transmitting module 1702.

The signal filling module 1701 carries a CRS or a DMRS, over a carrier over which a signal is transmitted to an RN, after the end of a guard interval TRG and before the start of a guard interval RTG, where the TRG is a guard interval for the RN to transform from transmitting a signal to receiving a signal over a backhaul link, and the RTG is a guard interval for the RN to transform from receiving a signal to transmitting a signal over the backhaul link.

The transmitting module 1702 transmits a data signal and/or a control signal to the RN over the carrier over which the CRS or the DMRS is carried.

The TRG occupies the $2^{nd}$, $3^{rd}$ and $4^{th}$ OFDM symbols arranged sequentially temporal order in a PRB pair, and the RTG occupies the $14^{th}$ OFDM symbol arranged sequentially in the temporal order in the PRB pair.

The signal filling module 1701 carries the CRS over the carrier over which the data signal and/or the control signal is transmitted to the RN by carrying the CRS in each of the $1^{st}$, $4^{th}$, $5^{th}$ and $8^{th}$ OFDM symbols after the end of the TRG, and carrying the CRS over each of the $1^{st}$, $4^{th}$, $7^{th}$ and $10^{th}$ carriers in an ascending order of the frequencies of respective carriers in a Physical Resource Block (PRB) pair, in each of the OFDM symbols with the CRSs to be carried therein.

When the signal filling module 1701 carries the DMRS over the carrier over which the data signal and/or the control signal is transmitted to the RN, the signal filling module carries the DMRS in each of the $2^{nd}$ and $3^{rd}$ OFDM symbols after the end of the TRG, and carries the DMRS over the $7^{th}$ carrier or each of the $6^{th}$ and $7^{th}$ carriers in an ascending order of the frequencies of respective came a PRB pair, in each of the OFDM symbols with the DMRSs to be carried therein; or the signal filling module carries the DMRS in each of the $2^{nd}$, $3^{rd}$, $6^{th}$ and $7^{th}$ OFDM symbols after the end of the TRG, and carries the DMRS over the $7^{th}$ carrier or each of the $6^{th}$ and the $7^{th}$ carriers in an ascending order of the frequencies of respective carriers in a PRB pair, in each of the OFDM symbols with the DMRSs to be carried therein; or the signal filling module carries the DMRS in each of the $2^{nd}$ and $3^{rd}$ OFDM symbols after the end of the TRG, and carries the DMRS over each of the $2^{nd}$ and $12^{th}$ or the $1^{st}$, $2^{nd}$, $11^{th}$ and $12^{th}$ carriers in an ascending order of the frequencies of respective carriers in a PRB pair, in each of the OFDM symbols with the DMRSs to be carried therein; or the signal filling module carries the DMRS in each of the $2^{nd}$, $3^{rd}$, $6^{th}$ and $7^{th}$ OFDM symbols after the end of the TRG, and carries the DMRS over each of the $2^{nd}$ and $12^{th}$ or the $1^{st}$, $2^{nd}$, $11^{th}$ and $12^{th}$ carriers in an ascending order of the frequencies of respective carriers in a PRB pair, in each of the OFDM symbols with the DMRSs to be carried therein; or the signal filling module carries the DMRS in each of the $2^{nd}$ and $3^{rd}$ OFDM symbols after the end of the TRG, and carries the DMRS over each of the $2^{nd}$, $7^{th}$ and $12^{th}$ or the $1^{st}2^{nd}6^{th}$, $7^{th}$, $11^{th}$ and $12^{th}$ carriers in an ascending order of the frequencies of respective carriers in a PRB pair, in each of the OFDM symbols with the DMRSs to be carried therein; or the signal filling module carries the DMRS in each of the $2^{nd}$, $3^{rd}$, $6^{th}$ and $7^{th}$ symbols after the end of the TRG, and carries the DMRS over each of the $2^{nd}$, $7^{th}$ and $12^{th}$ or the $1^{st}$, $2^{nd}$, $6^{th}$, $7^{th}$, $11^{th}$ and $12^{th}$ carriers in an ascending order of the frequencies of respective carriers in a PRB pair, in each of the OFDM symbols with the DMRSs to be carried therein.

FIG. 18 is a schematic structural diagram of a relay node according to an embodiment of the invention.

As illustrated in FIG. 18, the relay node includes a receiving module 1801 and a signal demodulating module 1802.

The receiving module 1801 receives a CRS or a DMRS carried over a carrier, over which a data signal and/or a control signal is transmitted, by an eNB, in a period after the end of a guard interval TRG and before the start of a guard interval RTG, where the TRG is a guard interval for the relay node to transform from transmitting a signal to receiving a signal over a backhaul link, and the RTG is a guard interval for the relay node to transform from receiving a signal to transmitting a signal over the backhaul link.

The signal demodulating module 1802 demodulates the data signal and/or the control signal transmitted from the eNB according to the received CRS or DMRS.

The TRG occupies the $2^{nd}$, $3^{rd}$ and $4^{th}$ OFDM symbols arranged sequentially in a temporal order in a PRB pair, and the RTG occupies the $14^{th}$ OFDM symbol arranged sequentially in the temporal order in the PRB pair.

The receiving module 1801 receives the CRS over each of the $1^{st}$, $4^{th}$, $7^{th}$ and $10^{th}$ carriers in an ascending order of the frequencies of respective carriers in a Physical Resource Block (PRB) pair, in each of the $1^{st}$, $4^{th}$, $5^{th}$ and $8^{th}$ OFDM symbols after the end of the TRG; or receives the DMRS over the $7^{th}$ carrier or each of the $6^{th}$ and $7^{th}$ carriers in an ascending order of the frequencies of respective carriers in a PRB pair, in each of the $2^{nd}$ and $3^{rd}$ OFDM symbols after the end of the TRG; or receives the DMRS over the $7^{th}$ carrier or each of the $6^{th}$ and the $7^{th}$ carriers in an ascending order of the frequencies of respective carriers in a PRB pair, in each of the $2^{nd}$, $3^{rd}$, $6^{th}$ and $7^{th}$ OFDM symbols after the end of the TRG; or receives the DMRS over each of the $2^{nd}$ and $12^{th}$ or the $1^{st}$, $2^{nd}$, $11^{th}$ and $12^{th}$ carriers in an ascending order of the frequencies of respective carriers in a PRB pair, in each of the $2^{nd}$ and $3^{rd}$ OFDM symbols after the end of the TRG; or receives the DMRS over each of the $2^{nd}$ and $12^{th}$ or the $1^{st}$, $2^{nd}$, $11^{th}$ and $12^{th}$ carriers in an ascending order of the frequencies of respective carriers in a PRB pair, in each of the $2^{nd}$, $3^{rd}$, $6^{th}$ and $7^{th}$ OFDM symbols after the end of the TRG; or receives the DMRS over each of the $2^{nd}$, $7^{th}$ and $12^{th}$ or the $1^{st}$, $2^{nd}$, $6^{th}$, $7^{th}$, $11^{th}$ and $12^{th}$ carriers in an ascending order of the frequencies of respective carriers in a PRB pair, in each of the $2^{nd}$ and $3^{rd}$ OFDM symbols after the end of the TRG; or receives the DMRS over each of the $2^{nd}$, $7^{th}$ and $12^{th}$ or the $1^{st}$, $2^{nd}$, $6^{th}$, $7^{th}$, $11^{th}$ and $12^{th}$ carriers in an ascending order of the frequencies of respective carriers in a PRB pair, in each of the $2^{nd}$, $3^{rd}$, $6^{th}$ and $7^{th}$ OFDM symbols after the end of the TRG.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

Those skilled in the art appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A wireless communication method, comprising: carrying, by an evolved Node B, eNB, a Common Reference Signal, CRS, or a Demodulation Reference Signal, DMRS, over a carrier over which a data signal and/or a control signal is transmitted to a Relay Node, RN, after the end of a guard interval TRG and before the start of a guard interval RTG, wherein the TRG is a guard interval for the RN to transform from transmitting a signal to receiving a signal over a backhaul link, and the RTG is a guard interval for the RN to transform from receiving a signal to transmitting a signal over the backhaul link;and demodulating, by the RN, the signal transmitted from the eNB according to the CRS or the DMRS, wherein the TRG occupies the 2.sup.nd, 3.sup.rd and 4.sup.th OFDM symbols arranged sequentially in a temporal order in a Physical Recource Block, PRB, pair; and the RTG occupies the 14.sup.th OFDM symbol arranged sequentially in the temporal order in the PRB pair.

2. The wireless communication method according to claim 1, wherein when the eNB carries the CRS over the carrier over which the data signal and/or the control signal is transmitted to the RN, the eNB caries the CRS in each of the $1^{st}$, $4^{th}$, $5^{th}$ and $8^{th}$ Orthogonal Frequency Division Multiplexing, OFDM, symbols after the end of the TRG, and carries the CRS over each of the $1^{st}$, $4^{th}$, $7^{th}$ and $10^{th}$ carriers in an ascending order of the frequencies of respective carriers in a PRB pair, in each of the OFDM symbols with the CRSs to be carried therein.

3. The wireless communication method according to claim 1, wherein when the eNB carries the DMRS over the carrier over which the data signal and/or the control signal is transmitted to the RN, the eNB carries the DMRS in each of the $2^{nd}$ and $3^{rd}$ OFDM symbols after the end of the TRG, and carries the DMRS over the $7^{th}$ carrier or each of the $6^{th}$ and $7^{th}$ carriers in an ascending order of the frequencies of respective carriers in a PRB pair, in each of the OFDM symbols with the DMRSs to be carried therein.

4. The wireless communication method according to claim 1, wherein when the eNB carries the DMRS over the carrier over which the signal is transmitted to the RN, the eNB carries the DMRS in each of the $2^{nd}$, $3^{rd}$, $6^{th}$ and $7^{th}$ OFDM symbols after the end of the TRG, and carries the DMRS over the $7^{th}$ carrier or each of the $6^{th}$ and the $7^{th}$ carriers in an ascending order of the frequencies of respective carriers in a PRB pair, in each of the OFDM symbols with the DMRSs to be carried therein.

5. The wireless communication method according to claim 1, wherein when the eNB carries the DMRS over the carrier over which the signal is transmitted to the RN, the eNB carries the DMRS in each of the $2^{nd}$ and $3^{rd}$ OFDM symbols after the end of the TRG, and carries the DMRS over each of the $2^{nd}$ and $12^{th}$ or the $1^{st}$, $2^{nd}$, $11^{th}$ and $12^{th}$ carriers in an ascending order of the frequencies of respective carriers in a PRB pair, in each of the OFDM symbols with the DMRSs to be carried therein.

6. The wireless communication method according to claim 1, wherein when the eNB carries the DMRS over the carrier over which the signal is transmitted to the RN, the eNB carries the DMRS in each of the $2^{nd}$, $3^{rd}$, $6^{th}$ and $7^{th}$ OFDM symbols after the end of the TRG, and carries the DMRS over each of the $2^{nd}$ and $12^{th}$ or the $1^{st}$, $2^{nd}$, $11^{th}$ and $12^{th}$ carriers in an ascending order of the frequencies of respective carriers in a PRB pair, in each of the OFDM symbols with the DMRSs to be carried therein.

7. The wireless communication method according to claim 1, wherein when the eNB carries the DMRS over the carrier over which the signal is transmitted to the RN, the eNB carries the DMRS in each of the $2^{nd}$ and $3^{rd}$ OFDM symbols after the end of the TRG, and carries the DMRS over each of the $2^{nd}$, $7^{th}$ and $12^{th}$ or the $1^{st}$, $2^{nd}$, $6^{th}$, $7^{th}$, $11^{th}$ and $12^{th}$ carriers in an ascending order of the frequencies of respective carriers in a PRB pair, in each of the OFDM symbols with the DMRSs to be carried therein.

8. The wireless communication method according to claim 1, wherein when the eNB carries the DMRS over the carrier over which the signal is transmitted to the RN, the eNB carries the DMRS in each of the $2^{nd}$, $3^{rd}$, $6^{th}$ and $7^{th}$ OFDM symbols after the end of the TRG, and carries the DMRS over each of the $2^{nd}$, $7^{th}$ and $12^{th}$ or the $1^{st}$, $2^{nd}$, $6^{th}$, $7^{th}$, $11^{th}$ and $12^{th}$ carriers in an ascending order of the frequencies of respective carriers in a PRB pair, in each of the OFDM symbols with the DMRSs to be carried therein.

9. A wireless communication system, comprising an evolved Node B, eNB, and a Relay Node, RN, wherein: the eNB is configured to carry a Common Reference Signal, CRS, or a Demodulation Reference Signal, DMRS, over a carrier over which a data signal and/or a control signal is transmitted to the RN, in a period after the end of a guard interval TRG and before the start of a guard interval RTG, wherein the TRG is a guard interval for the RN to transform from transmitting a signal to receiving a signal over a backhaul link, and the RTG is a guard interval for the RN to transform from receiving a signal to transmitting a signal over the backhaul link; and the RN is configured to demodulate the data signal and/or the control signal transmitted from the eNB according to the received CRS or the DMRS, wherein the TRG occupies the 2.sup.nd, 3.sup.rd and 4.sup.th OFDM symbols arranged sequentially in a temporal order in a Physical Resource Block, PRB, pair; and the RTG occupies the 14.sup.th OFDM symbols arranged sequentially in the temporal order in the PRB pair.

10. The wireless communication system according to claim 9, wherein:
when the eNB carries the CRS over the carrier over which the data signal and/or the control signal is transmitted to the RN, the eNB carries the CRS in each of the $1^{st}$, $4^{th}$, $5^{th}$ and $8^{th}$ Orthogonal Frequency Division Multiplexing, OFDM, symbols after the end of the TRG, and carries the CRS over each of the $1^{st}$, $4^{th}$, $7^{th}$ and $10^{th}$ carriers in an ascending order of the frequencies of respective carriers in a PRB pair, in each of the OFDM symbols with the CRSs to be carried therein; and
when the eNB carries the DMRS over the carrier over which the data signal and/or the control signal is transmitted to the RN, the eNB carries the DMRS in each of the $2^{nd}$ and $3^{rd}$ OFDM symbols after the end of the TRG, and carries the DMRS over the $7^{th}$ carrier or each of the $6^{th}$ and $7^{th}$ carriers in an ascending order of the frequencies of respective carriers in a PRB pair, in each of the OFDM symbols with the DMRSs to be carried therein; or
the eNB carries the DMRS in each of the $2^{nd}$, $3^{rd}$, $6^{th}$ and $7^{th}$ OFDM symbols after the end of the TRG, and carries the DMRS over the $7^{th}$ carrier or each of the $6^{th}$ and the $7^{th}$ carriers in an ascending order of the frequencies of respective carriers in a PRB pair, in each of the OFDM symbols with the DMRSs to be carried therein; or
the eNB carries the DMRS in each of the $2^{nd}$ and $3^{rd}$ OFDM symbols after the end of the TRG, and carries the DMRS over each of the $2^{nd}$ and $12^{th}$ or the $1^{st}$, $2^{nd}$, $11^{th}$ and $12^{th}$ carriers in an ascending order of the frequencies of respective carriers in a PRB pair, in each of the OFDM symbols with the DMRSs to be carried therein; or
the eNB carries the DMRS in each of the $2^{nd}$, $3^{rd}$, $6^{th}$ and $7^{th}$ OFDM symbols after the end of the TRG, and carries the DMRS over each of the $2^{nd}$ and $12^{th}$ or the $1^{st}$, $2^{nd}$, $11^{th}$ and $12^{th}$ carriers in an ascending order of the frequencies of respective carriers in a PRB pair, in each of the OFDM symbols with the DMRSs to be carried therein; or
the eNB carries the DMRS in each of the $2^{nd}$ and $3^{rd}$ OFDM symbols after the end of the TRG, and carries the DMRS over each of the $2^{nd}$, $7^{th}$ and $12^{th}$ or the $1^{st}$, $2^{nd}$, $6^{th}$, $7^{th}$, $11^{th}$ and $12^{th}$ carriers in an ascending order of the frequencies of respective carriers in a PRB pair, in each of the OFDM symbols with the DMRSs to be carried therein; or
the eNB carries the DMRS in each of the $2^{nd}$, $3^{rd}$, $6^{th}$ and $7^{th}$ OFDM symbols after the end of the TRG, and carries the DMRS over each of the $2^{nd}$, $7^{th}$ and $12^{th}$ or the $1^{st}$, $2^{nd}$, $6^{th}$, $7^{th}$, $11^{th}$ and $12^{th}$ carriers in an ascending order of the frequencies of respective carriers in a PRB pair, in each of the OFDM symbols with the DMRSs to be carried therein.

11. An evolved Node B, comprising a signal filling module and a transmitting module, where the signal filling module is configured to carry a Common Reference Signal, CRS, or a Demodulation Reference Signal, DMRS, over a carrier over which a data signal and/or a control signal is transmitted to a Relay Node, RN, after the end of a guard interval TRG and before the start of a guard interval RTG, wherein the TRG is a guard interval for the RN to transform from transmitting a signal to receiving a signal over a backhaul link, and the RTG is a guard interval for the RN to transform from receiving a signal to transmitting a signal over the backhaul link; and the transmitting module is configured to transmit the data signal and/or the control signal to the RN over the carrier over which the CRS or the DMRS is carried, Wherein the TRG occupies the 2.sup.nd, 3.sup.rd and 4.sup.th OFDM symbols arranged sequentially in a temporal order in a Physical Resource Block, PRB, Pair; and the RTG occupies the 14.sup.th OFDM symbol arranged sequentially in the temporal order in the PRB pair.

12. The evolved Node B according to claim 11 wherein:
the signal filling module carries the CRS over the carrier over which the data signal and/or the control signal is transmitted to the RN by carrying the CRS in each of the $1^{st}$, $4^{th}$, $5^{th}$ and $8^{th}$ Orthogonal Frequency Division Multiplexing, OFDM, symbols after the end of the TRG, and carrying the CRS over each of the $1^{st}4^{th}$, $7^{th}$ and $10^{th}$ carriers in an ascending order of the frequencies of respective carriers in a PRB pair, in each of the OFDM symbols with the CRSs to be carried therein; and when the DMRS is carried over the carrier over which the data signal and/or the control signal is transmitted to the RN, the signal filling module carries the DMRS in each of the $2^{nd}$ and $3^{rd}$ OFDM symbols after the end of the TRG, and carries the DMRS over the $7^{th}$ carrier or each of the $6^{th}$ and $7^{th}$ carriers in an ascending order of the frequencies of respective carriers in a PRB pair, in each of the OFDM symbols with the DMRSs to be carried therein; or the signal filling module carries the DMRS in each of the $2^{nd}$, $3^{rd}$, $6^{th}$ and $7^{th}$ OFDM symbols after the end of the TRG, and carries the DMRS over the $7^{th}$ carrier or each of the $6^{th}$ and the $7^{th}$ carriers in an ascending order of the frequencies of respective carriers in a PRB pair, in each of the OFDM symbols with the DMRSs to be carried therein; or the signal filling module carries the DMRS in each of the $2^{nd}$ and $3^{rd}$ OFDM symbols after the end of the TRG, and carries the DMRS over each of the $2^{nd}$ and $12^{th}$ or the $1^{st}$, $2^{nd}$, $11^{th}$ and $12^{th}$ carriers in an ascending order of the frequencies of respective carriers in a PRB pair, in each of the OFDM symbols with the DMRSs to be carried therein; or the signal filling module carries the DMRS in each of the $2^{nd}$, $3^{rd}$, $6^{th}$ and $7^{th}$ OFDM symbols after the end of the TRG, and carries the DMRS over each of the $2^{nd}$ and $12^{th}$ or the $1^{st}$, $2^{nd}$, $11^{th}$ and $12^{th}$ carriers in an ascending order of the frequencies of respective carriers in a PRB pair, in each of the OFDM symbols with the DMRSs to be carried therein; or the signal filling module carries the DMRS in each of the $2^{nd}$ and $3^{rd}$ OFDM symbols after the end of the TRG, and carries the DMRS over each of the $2^{nd}$, $7^{th}$ and $12^{th}$ or the $1^{st}$, $2^{nd}6^{th}$, $7^{th}$, $11^{th}$ and $12^{th}$ carriers in an ascending order of the frequencies of respective carriers in a PRB pair, in each of the OFDM symbols with the DMRSs to be carried therein; or the signal filling module carries the DMRS in each of the $2^{nd}$, $3^{rd}$, $6^{th}$ and $7^{th}$ OFDM symbols after the end of the TRG, and carries the DMRS over each of the $2^{nd}$, $7^{th}$ and $12^{th}$ or the $1^{st}$, $2^{nd}$, $6^{th}$, $7^{th}$, $11^{th}$ and $12^{th}$ carriers in an ascending order of the frequencies of respective carriers in a PRB pair, in each of the OFDM symbols with the DMRSs to be carried therein.

13. A relay node, comprising a receiving module and a signal demodulating module, wherein: the receiving module is configured to receive a Common Reference Signal, CRS, or a Demodulation Reference Signal, DMRS, carried over a carrier, over which a data signal and/or a control signal is transmitted, by an evolved Node B, eNB, in a period after the end of a guard interval TRG and before the start of a guard interval RTG, wherein the TRG is a guard interval for the relay node to transform from transmitting a signal to receiving a signal over a backhaul link, and the RTG is a guard interval for the relay node to transform from receiving a signal to transmitting a signal over the backhaul link; and the signal demodulating module is configured to demodulate the data signal and/or the control signal transmitted from the eNB according to the received CRS or DMRS., Wherein the TRG occupies the 2.sup.nd, 3.sup.rd and 4.sup.th OFDM symbols arranged sequentially in a temporal order in a Physical Resource Block, PRB, Pair; and the RTG occupies the 14.sup.th OFDM symbol arranged sequentially in the temporal order in the PRB pair.

14. The relay node according to claim 13, wherein:
the receiving module receives the CRS over each of the $1^{st}$, $4^{th}$, $7^{th}$ and $10^{th}$ carriers in an ascending order of the frequencies of respective carriers in a PRB pair, in each of the $1^{st}$, $4^{th}$, $5^{th}$ and $8^{th}$ Orthogonal Frequency Division Multiplexing, OFDM, symbols after the end of the TRG; or receives the DMRS over the $7^{th}$ carrier or each of the $6^{th}$ and $7^{th}$ carriers in an ascending order of the frequencies of respective carriers in a PRB pair, in each of the $2^{nd}$ and $3^{rd}$ OFDM symbols after the end of the TRG; or receives the DMRS over the $7^{th}$ carrier or each of the $6^{th}$ and the $7^{th}$ carriers in an ascending order of the frequencies of respective carriers in a PRB pair, in each of the $2^{nd}$, $3^{rd}$, $6^{th}$ and $7^{th}$ OFDM symbols after the end of the TRG; or receives the DMRS over each of the $2^{nd}$ and $12^{th}$ or the $1^{st}$, $2^{nd}$, $11^{th}$ and $12^{th}$ carriers in an ascending order of the frequencies of respective carriers in a PRB pair, in each of the $2^{nd}$ and $3^{rd}$ OFDM symbols after the end of the TRG; or receives the DMRS over each of the $2^{nd}$ and $12^{th}$ or the $1^{st}$, $2^{nd}$, $11^{th}$ and $12^{th}$ carriers in an ascending order of the frequencies of respective carriers in a PRB pair, in each of the $2^{nd}$, $3^{rd}$, $6^{th}$ and $7^{th}$ OFDM symbols after the end of the TRG; or receives the DMRS over each of the $2^{nd}$, $7^{th}$ and $12^{th}$ or the $1^{st}$, $2^{nd}$, $6^{th}$, $7^{th}$, $11^{th}$ and $12^{th}$ carriers in an ascending order of the frequencies of respective carriers in a PRB pair, in each of the $2^{nd}$ and $3^{rd}$ OFDM symbols after the end of the TRG; or receives the DMRS over each of the $2^{nd}$, $7^{th}$ and $12^{th}$ or the $1^{st}$, $2^{nd}$, $6^{th}$, $7^{th}$, $11^{th}$ and $12^{th}$ carriers in an ascending order of the frequencies of respective carriers in a PRB pair, in each of the $2^{nd}$, $3^{rd}$, $6^{th}$ and $7^{th}$ OFDM symbols after the end of the TRG.

* * * * *